United States Patent [19]

Bruhnke

[11] Patent Number: 5,789,515
[45] Date of Patent: Aug. 4, 1998

[54] POLYSILOXANE-POLY(OXYALKYLENE) COPOLYMER-SUBSTITUTED COLORANT

[75] Inventor: John D. Bruhnke, Spartanburg, S.C.

[73] Assignee: Milliken Research Corporation, Spartanburg, S.C.

[21] Appl. No.: 816,082

[22] Filed: Mar. 13, 1997

[51] Int. Cl.$^6$ .................. C08G 77/06; C09B 62/00
[52] U.S. Cl. ............... 528/12; 528/14; 528/20; 528/22; 8/543; 8/549; 8/581; 8/602; 8/609
[58] Field of Search ................... 528/12, 14, 20, 528/22; 8/543, 549, 581, 602, 609

[56] References Cited

U.S. PATENT DOCUMENTS

| | | | |
|---|---|---|---|
| 3,699,135 | 10/1972 | Baptista et al. | 260/37 SB |
| 4,131,609 | 12/1978 | Wynne et al. | 260/260 |
| 4,132,842 | 1/1979 | Wynne et al. | 528/33 |
| 4,284,729 | 8/1981 | Cross et al. | 521/158 |
| 4,398,915 | 8/1983 | Panto et al. | 8/543 |
| 4,405,801 | 9/1983 | Hirsh et al. | 556/422 |
| 4,634,555 | 1/1987 | Baxter et al. | 540/126 |
| 4,640,690 | 2/1987 | Baumgartner et al. | 8/506 |
| 4,664,708 | 5/1987 | Allen | 106/22 |
| 4,714,770 | 12/1987 | Hsu et al. | 528/43 |
| 4,836,851 | 6/1989 | Pawlowski et al. | 106/22 |
| 5,270,363 | 12/1993 | Kluger et al. | 524/90 |
| 5,271,868 | 12/1993 | Azechi et al. | 252/358 |
| 5,275,647 | 1/1994 | Winnik | 106/22 E |
| 5,300,667 | 4/1994 | Kasprzak et al. | 556/437 |
| 5,368,639 | 11/1994 | Hasegawa et al. | 106/490 |
| 5,376,301 | 12/1994 | Fleuren et al. | 252/174.15 |

OTHER PUBLICATIONS

Sela et al., "Newly designed polysiloxane–graft–poly(oxyethylene) copolymeric surfactants: preparation, surface activity and emulsification properties," Colloid Polym Sci 272:684–691 (1994).

Ni et al., "Synthesis of a Novel Polysiloxane–based Polymer Electrolyte and its Ionic Conductivity," Polymers for Advanced Technologies, vol. 4, pp. 80–84 (1993).

*Primary Examiner*—Randy Gulakowski
*Attorney, Agent, or Firm*—Terry T. Moyer; William S. Parks

[57] ABSTRACT

A colorant composition has the structure ABXYZ, where
- A is an organic chromophore;
- B is an electrophilic reactive group covalently bonded to A directly or through a linking group;
- X is a nucleophilic linking group covalently bonding B and Y
- Y is a poly(oxyalkylene)-polysiloxane copolymer; and
- Z is a terminal group for Y.

The colorant composition can be prepared from a reactive dye AB which is reacted with XYZ, a poly(oxyalkylene)-polysiloxane copolymer.

15 Claims, No Drawings

5,789,515

POLYSILOXANE-POLY(OXYALKYLENE) COPOLYMER-SUBSTITUTED COLORANT

BACKGROUND OF THE INVENTION

This invention relates to a colorant having a siloxane-containing poly(oxyalkylene) copolymer substituent, and in particular to a colorant made from a reactive dye.

Examples of colorants having polymeric substituents may be found in the following Panto et al. U.S. Pat. No. 4,398,915 discloses a reactive dye coupled to a starch to form a water insoluble colorant for dyeing crepe paper; Baxter et al. U.S. Pat. No. 4,634,555 discloses a reactive phthalocyanine dye coupled to a polyether substituent for use in an aqueous ink composition; Allen, U.S. Pat. No. 4,664,708 discloses a reactive dye coupled to a polyethylenimine for use in an aqueous ink composition; Pawlowski et al, U.S. Pat. No. 4,836,851 discloses a reactive dye coupled to a polyhydroxy substituent, such as sorbitol, for use in an aqueous ink composition; Winnik, U.S. Pat. No. 5,275,647 discloses a reactive dye coupled to a castor oil poly(oxyethylene) or polyethyleneimine surfactant to form a micelle for use in ink compositions.

Combinations of pigments and alkylpolysiloxane are disclosed in Hasegawa et al, U.S. Pat. No. 5,368,639. For example, a linear alkylpolysiloxane is adhered in an oriented mode to the surface of a pigment, such as titanium dioxide, by heat treatment. The treated pigment may be used in cosmetics. Sela, et al., "Newly designed polysiloxane-graft-poly(oxyethylene) copolymeric surfactants: preparation, surface activity and emulsification properties," Colloid Polym Sci 272:684–691 (1994) discloses polymeric surfactants based on poly(methylhydrogen siloxane) (PHMS) and/or poly(dimethylsiloxane) (PHMS-PDMS) by sililation of active Si—H group with an active omega-vinyl group of undecenoicpolyethyleneglycol esters to form polysiloxane-grafted-polyethyleneglycol combcopolymeric surfactants.

Ni, et al., "Synthesis of a Novel Polysiloxane-based Polymer Electrolyte and its Ionic Conductivity," Polymers for Advanced Technologies, Vol. 4, pp. 80–84 (1993) discloses graft copolymers synthesized by hydrosilylation of poly[(hydromethylsiloxane)-co-dimethylsiloxane)] and allylether of poly(ethyleneoxide)-co-(propyleneoxide)] (poly(EO-CO-PO)). Complexes of the network polymers with alkali metal salt exhibit high ionic conductivity.

Polydimethylsiloxanes prepared as copolymers with alkylene oxides are widely used as surfactants. Altering the amounts of alkylene oxide (hydrophile) and dimethylsiloxane (lipophile) affects surfactant properties. The higher the alkylene oxide content the higher the hydrophilicity. Materials with ethylene oxide contents 75% and higher are freely soluble in water and low molecular weight copolymers can be used as wetting agents, anti-foggers, anti-foamants, and slip agents in inks.

U.S. Pat. No. 3,699,135 to Baptista et al. discloses photoresistant polymeric dyes prepared by copolymerizing diorganodifunctionalsilane with a derivative of anthraquinone containing two aliphatic hydroxy groups.

U.S. Pat. No. 4,131,609 to Wynne et al. discloses a silicon-phthalocyanine-siloxy monomer having the formula: PcSi(OSiR'Ph(OSiR"$_2$)$_r$X)$_2$ wherein X is a hydroxyl or ureido group, Pc is a phthalocyanine nucleus, R' and R" are alkyl groups having from 1 to 8 carbon atoms, and r is an integer from 1 to 4. The monomers can be used as dyes and in polymer synthesis as reactive intermediates.

U.S. Pat. No. 5,271,868 to Azechi et al. discloses an antifoam composition for use in high temperature dyeing processes comprising polyoxyalkylene-modified polydimethylsiloxane.

U.S. Pat. No. 5,300,667 to Kasprzak et al. discloses a composition comprising a polydimethylsiloxane and a polyoxyalkylene siloxane copolymer.

SUMMARY OF THE INVENTION

The present invention relates to a colorant composition having the structure ABXYZ, where A is an organic chromophore;

B is an electrophilic reactive group covalently bonded to A directly or through a linking group;

X is a nucleophilic linking group covalently bonding B and Y;

Y is a poly(oxyalkylene)-containing polysiloxane moiety; and

Z is a terminal group for Y.

DETAILED DESCRIPTION OF THE INVENTION

Without limiting the scope of the invention, the preferred embodiments and features are hereinafter set forth. Unless otherwise directed, all parts and percentages are by weight and conditions are ambient, i.e., one atmosphere pressure at 25° C. Unless otherwise specified, aliphatic hydrocarbons are from 1 to 12 carbon atoms in length and cycloaliphatic hydrocarbons comprise from 3 to 8 carbon atoms.

All of the U.S. patents disclosed in this specification are incorporated herein by reference in their entirety.

The compounds of the present invention are colorants having a polysiloxanepoly(oxyalkylene) copolymer substituent. The colorant may be synthesized by the reaction of a reactive dye with the copolymer through a linking group. Reactive dyes can be represented as AB and are those dyes comprising an organic chromophore component A having an electrophilic functional group B capable of reacting with a nucleophile to form a covalent bond, e.g., by addition or displacement.

A broad range of reactive dyes has been synthesized and includes those incorporating: azo groups such as monoazo, bisazo, and polyazo including their complexes with Cr, Fe, Co, and Cu; phthalocyanine; anthraquinone; aza [18] annulene; formazan copper complex; triphenodioxazine; nitroso; nitro; diarylmethane; triarylmethane; xanthene; acridene; methine; thiazole; indamine; azine; oxazine; thiazine; quinoline; indigoid; indophenol; lactone; aminoketone; hydroxyketone; and stilbene chromophores. Preferably, the reactive dye incorporates an azo, phthalocyanine or anthraquinone chromophore group.

The reactive dye moieties AB contain organic chromophore A and at least one electrophilic functional group B. When multiple functional groups are provided, it is often desirable that the groups vary in reactivity, to maximize conversion. Examples of electrophilic functional groups which may be incorporated into the reactive dye include: monohalotriazine; dihalotriazine; monohalopyrimidine; dihalopyrimidine; trihalopyrimidine; dihaloquinoxaline; dihalopyridazone; dihalophthalazine; halobenzothiazole; mono-(m-carboxypyridinium)-triazine; amino epoxide; methylamino; sulfatoethyl sulfone; sulfatoethyl sulfonamide; chloroethyl sulfone; vinyl sulfone; phenylamino sulfone; acrylamide; alpha-haloacryloylamide; alpha, beta-dihalopropionyl amide; halosulfonyl pyrimidine; sulfatoethylamino sulfone; sulfatopropionamide; halosulfothiazinylamide and haloacetylamide. The halo component may be selected from fluorine, chlorine and bromine. Preferably, the reactive dye incorporates an electrophilic functional group selected from monochlorotriazine, monofluorotriazine, dichlorotriazine, sulfatoethyl sulfone, vinyl sulfone, 2,3-dichloroquinoxaline and 2,4-difluor-5-chloropyrimidine groups.

Reactive dyes meeting the above description are commercially available, described in the Colour Index, 3rd Edition, the Society of Dyers and Colourists (1971) and in the available published literature. By way of example and not limitation, the following reactive dyes may be employed: C.I. Reactive Black 5, C.I. Reactive Blue 2, C.I. Reactive Blue 4, C. I. Reactive Blue 5, C.I. Reactive Blue 7, C.I. Reactive Blue 15, C.I. Reactive Blue 19, C. I. Reactive Blue 27, C.I. Reactive Violet 3, C.I. Reactive Violet 5, C.I. Reactive Red 2, C.I. Reactive Red 24, C.I. Reactive Orange 4, C.I. Reactive Orange 13, C.I. Reactive Orange 16, C.I. Reactive Orange 78, C.I. Reactive Yellow 3, C.I. Reactive Yellow 13, C.I. Reactive Yellow 14, C. I. Reactive Yellow 17, and C.I. Reactive Yellow 95.

The poly(oxyalkylene)-containing polysiloxane substituent Y is covalently bonded to the electrophilic group B of reactive dye AB through X, a nucleophilic linking group, e.g., one selected from the group consisting of NR, O, and S; where R is selected from the group consisting of H, alkyl, and YZ. Two poly(oxyalkyene)-containing polysiloxane substituents may be bonded to reactive dye AB through a linking group comprising a trivalent atom, e.g., N. The number of poly(oxyalkylene)-containing polysiloxane chains per chromophore may be from 1–6, preferably 1–4, most preferably 1, 2 or 3.

The copolymer substituent Y has a molecular weight which can range from 300 to 10000, preferably 450 to 5000, more preferably 800 to 1400.

The copolymer substituent Y which is bonded to the reactant dye AB through X can be described as a polysiloxane-poly(oxyalkylene) copolymer which incorporates (a) a polysiloxane segment characterized by a—Si($R^1$)($R^2$)O- repeating group wherein $R^1$ and $R^2$ are each selected from alkyl, phenyl, vinyl, 3,3,3-trifluoropropyl, and hydrogen (preferably $R^1$ and $R^2$ are alkyl, with methyl especially preferred); and (b) a polyether segment characterized by a poly(oxyalkylene) group which may be i) in the copolymer backbone or ii) pendent from a siloxane or silane repeating group.

The (oxyalkylene)-substituents themselves in Y can be polymers or copolymers. In this regard, polyalkylene oxides and copolymers of same which may be employed to provide the colorant of the present invention are, without limitation, polyethylene oxides, polypropylene oxides, polybutylene oxides, copolymers of polyethylene oxides, polypropylene oxides and polybutylene oxides, and other copolymers, including block copolymers, in which a majority of the polymeric substituent is polyethylene oxide, polypropylene oxide and/or polybutylene oxide. The poly(oxyalkylene) group can contain the residues of a plurality of alkylene oxides, preferably alkylene oxides selected from ethylene oxide and propylene oxide.

The end group Z of poly(oxyalkylene)-containing substituent Y is not believed to be critical insofar as the functioning of the colorant is concerned. The end group Z can be any suitable terminal group, e.g., one selected from the group consisting of hydroxyl, alkyl, e.g., $C_1$ to $C_4$ alkyl, amino, amido, alkyl ester, e.g., acetyl, phenyl ester, alkyl ether, alkyl acetal, and BA where Y has a nucleophilic end group (such as where the polysiloxane-poly(oxyalkylene) copolymer is a diamine). Where Z is XBA the resulting colorant has the structure ABXYXBA where X,B, and A are as described above. Preferably, Z is selected from the group consisting of OH and amino. The end group can itself contribute to solubility characteristics of the colorant product. Examples of other suitable terminal groups are those disclosed in U.S. Pat. No. 5,270,363 to Kluger, et al. for poly(oxyalkylene) polymers.

The solubility of the colorant composition of the present invention also may be varied by the relative hydrophilic/oleophilic character of the poly(oxyalkylene)-containing polysiloxane substituent, as well as the presence or absence of ionic groups on the organic chromophore. Increasing alkylene oxide content enhances the solubility of the colorant in polar solvents while reducing the alkylene oxide content of the colorant composition increases solubility in non-polar solvents. In general, the alkylene oxide content of the copolymer will range from 5 to 95 wt. %, preferably, 50 to 90 wt. %. When it is desired to provide a colorant which is water-soluble at levels of 1% or greater, the copolymer can be provided with an ethylene oxide content of at least 70 wt. %.

Copolymers having pendent poly(oxyalkylene) groups along a polysiloxane backbone may be synthesized by incorporating siloxane groups with reactive functionalities into the backbone of the polymer. The siloxane groups may be alkoxylated, esterified or otherwise provided with a poly(oxyalkylene) functionality. Copolymers having a polysiloxane backbone and pendent poly(oxyalkylene) groups are commercially available in the Masil Silicone Surfactants product line, available from PPG Industries, Inc., Gurnee, Ill., USA.

Polysiloxane-polyether copolymers are disclosed in the following patents: Azechi et al. U.S. Pat No. 5,271,868; Kasprzak et al. U.S. Pat. No. 5,300,667; and Fleuren et al. U.S. Pat. No. 5,376,301. Another method of synthesizing polysiloxane-polyether copolymers is disclosed by Jainlong Ni et al. "Synthesis of a Novel Polysiloxane-based Polymer Electrolyte and its Ionic Conductivity", Polymers for Advanced Technologies Vol. 4, pp 80–84 (1993). Allyl polyethers are grafted onto polysiloxane to form the copolymer. Sela et al., "Newly Designed Polysiloxane—graft—poly(oxyethylene) Copolymeric Surfactants", Colloid PolymSci 272:684–691 (1994) disclose comb grafted surfactants based on a poly(methylhydrogen siloxane)/poly(dimethylsiloxane) block copolymer backbone which is sililated with a vinyl terminated poly(oxyethylene) group.

Alternatively, the polysiloxane-poly(oxyalkylene) copolymer is a block copolymer incorporating a poly(oxyalkylene) substituted silane. For example, copolymers incorporating silane groups having the structure—Si($R^3$-poly(oxyalkylene))($R^4$), $_{where\ R^3}$ is an alkylene group, preferably methylene or ethylene, and $R^4$ is H, alkyl, or phenyl, preferably methyl. Such copolymers are commercially available, for example, the dimethylsiloxane-alkylene oxide copolymers available from Petrarch Systems, Silanes and Silicones Group, Bristol, Pa., USA.

Block copolymers having a poly(oxyalkylene) segment in the backbone may be synthesized by procedures well known in the art, and are commercially available from Dow Corning, Midland, Mich., USA under the 5103 Fluid and Q, e.g., Q2-5211, wetting agent product lines.

For example, Y can be a poly(oxyalkylene)-containing polysiloxane moiety selected from the group consisting of $(OSi(R')(R''))_iO(SiR'R'''O(C_aH_{2a}O)_m(C_bH_{2b}O)_n)_j$ and $(OSi(R')(R''))_i(R'''O(C_aH_{2a}O)m\ (C_bH_{2b}O)_n)_j$ where $R'$ and $R''$ are each alkyl, preferably C1 to C4 alkyl, more preferably methyl, R''' is alkylene, preferably C1 to C3 alkylene, more preferably ethylene, i and j are integers selected to provide a molecular weight for Y of 300 to 10000, preferably 450 to 5000, more preferably 800 to 1400, i is at least 3, j is at least 1, a and b are different and from 1 to 8, preferably from 1 to 4, more preferably from 2 to 3, m is at least 3, preferably 5 to 15, and n is from 0 to 15, preferably 0.

Further description of the copolymers useful in the present invention may be found in the Encyclopedia of Polymer Science and Engineering, John Wiley & Sons, Vol. 15, page 234–244 (1989) and the references cited therein.

The polysiloxane-poly(oxyalkylene) copolymer Y is provided with at least one terminal or pendent nucleophilic group, X, which can react with the electrophilic functional group B of the reactive dye compound AB. By way of example, the terminal nucleophilic group may be selected from hydroxy, amino (primary or secondary) and thio groups, preferably an hydroxy or amino group.

The polysiloxane-poly(oxyalkylene) copolymer-containing moiety XY, or XYZ may be covalently bonded to the reactive dye AB by heating, with or without solvent, e.g., toluene, water, etc., the copolymer-containing moiety and the dye to a temperature of at least 40° C., preferably at least 60° C. If the terminal group of Y is a nucleophilic group, it can itself react with another reactive dye. The reaction time will vary according to the temperature employed, i.e., increasing the temperature will increase the rate of reaction. For example, at 85° C., the reaction is complete in two hours. The pH of the reaction is maintained to avoid protonating amines where present. An excess of the copolymer is typically employed to insure complete conversion and to minimize unreacted and unsubstituted dye, which can cause staining. Acid scavengers, e.g. sodium carbonate may be present in the reaction mixture. The polysiloxane-poly(oxyalkylene) copolymer substituted colorant formed in the reaction composition may be concentrated or diluted as desired for a particular application by the evaporation or addition of water or other compatible solvent.

The present invention provides polysiloxane-poly(oxyalkylene) copolymer-substituted colorants which are compatible with polar solvents, e.g., water- and methanol-soluble colorants. Moreover, the present invention colorants can be a neat liquid at 25° C. and are thus more readily miscible with polar liquid solvents used in coloring processes. This provides a distinct advantage over reactive dyes which are generally insoluble in methanol and less than 10% soluble in water. Being liquid, the colorants are easy to dispense and do not require any premixing of powders. Thus, the present invention liquid colorants are useful for applications where hazardous powdering or dusting conditions associated with the use of particulate colorants are to be avoided. Moreover, the present colorants can be used at high color concentrations without formation of undesired precipitates. The colorants can have a low staining factor and thereby reduce or eliminate staining on most hard surfaces, skin, fabrics, and equipment; indeed, such colorants can often be cleaned up with cold water.

The colorants of the present invention are especially suited for non-ink applications requiring a lower stain factor. For example, such applications include colorants for products where it is desired that the colorant not permanently stain the items treated.

The colorants of the present invention can be used over a wide pH range and are compatible with fragrances and preservatives, without complexing or destabilizing the resulting mixture. They are also compatible with most cationic, anionic, non-ionic and quaternary systems. Because these colorants make true solutions, not emulsions or dispersions, the resulting formulations are clear and brilliant in appearance.

The silicone moieties in the colorant compositions of the present invention allow such compositions to be used as anti-static agents, lubricants, wetting agents, emulsifiers, anti-fog agents, non-ionic surfactants and dispersion aids. In addition, the present colorants may be used in inks, such as flexographic and gravure inks. Other applications include colorants for fabric softeners, laundry detergents, soaps, hard surface cleaners, antifreeze, and miscellaneous aqueous and non-aqueous liquids and pastes, in concentrations ranging from 0.001 to 10 wt %, preferably 0.01 to 5 wt %. Additionally, the colorants of the present invention can be used to color thermoplastic and thermoset resins as disclosed in U.S. Pat. No. 4,640,490 to Baumgartner et al. and U.S. Pat. No. 4,284,729 to Cross, et al.

The invention may be further understood by reference to the following examples, but is not intended to be construed as being unduly limited thereby.

EXAMPLE 1

45.4 gm of C.I. Reactive Blue 15 (35%) is mixed with 16.1 gm of Fluid Q4-3667 (poly(oxyethylene-dimethylsiloxane) copolymer) available from Dow Corning, Midland, Mich., USA, 1.3 gm of sodium carbonate, and 60 gm water. Reactive Blue 15 has monochlorotriazine as its electrophilic substituent B, Fluid Q4-3667 has OH as its reactive nucleophilic group X, and OH as its end group Z. The mixture is heated to 85° C. for two hours. The concentrated polymeric colorant is then diluted with water.

EXAMPLE 2

61.5 gm of C.I. Reactive Blue 7 (60%) is mixed with 120 gm of Fluid Q4-3667 (poly(oxyethylene-dimethylsiloxane) copolymer) and 5.3 gm of sodium carbonate. The mixture is heated to 85° C. for two hours. The concentrated polymeric colorant is then diluted with water.

EXAMPLE 3

61.6 gm of C.I. Reactive Red 2 (50%) is mixed with 146.8 gm of Fluid Q4-3667 (poly(oxyethylene-dimethylsiloxane) copolymer), 5.8 gm of sodium carbonate, and 100 gm water. The mixture is heated to 85° C. for two hours. The concentrated polymeric colorant is then diluted with water.

EXAMPLE 4

62.8 gm of C.I. Reactive Blue 19 (50%) is mixed with 66.2 gm of Fluid Q4-3667 (poly(oxyethylene-dimethylsiloxane) copolymer), 3 gm of sodium carbonate, and 100 gm water. The mixture is heated to 85° C. for two hours. The concentrated polymeric colorant is then diluted with water.

It is claimed:

1. A colorant composition having the structure ABXYZ, where

A is an organic chromophore;

B is an electrophilic reactive group covalently bonded to A directly or through a linking group;

X is a nucleophilic linking group covalently bonding B and Y;

Y is a poly(oxyalkylene)-polysiloxane copolymer; and

Z is a terminal group for Y.

2. The colorant composition of claim 1 wherein

A is an organic chromophore selected from the group consisting of azo, phthalocyanine; anthraquinone; aza [18] annulene; formazan copper complex; triphenodioxazine; nitroso; nitro; diarylmethane; triarylmethane; xanthene; acridene; methine; thiazole; indamine; azine; oxazine; thiazine; quinoline; indigoid; indophenol; lactone; aminoketone; hydroxyketone; and stilbene chromophores;

B is an electrophilic reactive group selected from the group consisting of monohalopyrimidine; dihalopyrimidine; trihalopyrimidine; dihaloquinoxaline; dihalopyridazone; dihalophthalazine; halobenzothiazole; amino epoxide; methylamino; sulfatoethyl sulfone; sulfatoethyl sulfonamide; chloroethyl sulfone; vinyl sulfone; phenylamino sulfone; acrylamide; alpha-haloacryloylamide; alpha, beta-dihalopropionyl amide; halosulfonyl pyrimidine; sulfatoethylamino sulfone; sulfatopropionamide; halosulfothiazinylamide; and haloacetylamide; covalently bonded to A directly or through a linking group;

X is a nucleophilic linking group covalently bonding B and Y, selected from the group consisting of NR, O, and S, where R is selected from the group consisting of H, alkyl, aryl, and YZ;

Y is a polysiloxane-poly(oxyalkylene) copolymer having a backbone and a molecular weight of 300 to 10000 which comprises
  (a) a polysiloxane segment characterized by a—Si($R^1$)($R^2$)O—repeating group wherein $R^1$ and $R^2$ are each selected from the group consisting of alkyl, phenyl, vinyl, 3,3,3-trifluoropropyl, and hydrogen; and
  (b) a polyether segment characterized by a poly(oxyalkylene) group which is i) in the copolymer backbone or ii) pendent from a siloxane or silane repeating group, said poly(oxyalkylene) group comprising 5 to 95 wt % of Y; and Z is a terminal group of Y, selected from the group consisting of hydroxyl, amino, amido, alkyl ester, phenyl ester, alkyl ether, alkyl acetal, and BA where Y has a nucleophilic end group.

3. The colorant composition of claim 2 wherein

A is selected from the group consisting of azo, phthalocyanine and anthraquinone chromophores;

B is selected from the group consisting of monochlorotriazine, dichlorotriazine, monofluorotriazine, 2,3-dichloroquinoxaline, 2,4-difluor-5-chloropyrimidine, sulfatoethyl sulfone, and vinyl sulfone;

X is NR where R is selected from the group consisting of H, alkyl, aryl, and YZ;

Y is a poly(oxyalkylene)-polysiloxane copolymer selected from the group consisting of (OSi(R')(R''))$_i$O (SiR'R'''O($C_aH_{2a}$O)$_m$($C_bH_{2b}$O)$_n$)$_j$ and (OSi(R')(R''))$_i$ (R'''O($C_aH_{2a}$O)$_m$($C_bH_{2b}$O)$_n$)$_j$ where R' and R'' are each alkyl, R''' is alkylene, i and j are integers selected to provide a molecular weight for Y of 300 to 10,000, i is at least 3, j is at least 1, a and b are different and from 1 to 8, m is at least 3, and n is from 0 to 15; and Z is a terminal group for Y, selected from the group consisting of OH, alkyl, alkyl ester, amino, and amido.

4. The colorant composition of claim 3 wherein

A is anthraquinone;

B is selected from the group consisting of monochlorotriazine, sulfatoethyl sulfone, and vinyl sulfone;

Y is a poly(oxyalkylene)-polysiloxane copolymer selected from the group consisting of (OSi(R')(R''))$_i$O (SiR'R'''O($C_aH_{2a}$O)$_m$($C_bH_{2b}$O)$_n$)$_j$ and (OSi(R')(R''))$_i$ (R'''O($C_aH_{2a}$O)$_m$($C_bH_{2b}$O)$_n$)$_j$ where R' and R'' are each methyl, R''' is alkylene, i and j are integers selected to provide i) a molecular weight for Y of 450 to 5000 and ii) an alkylene oxide content of 50 to 90 wt %, a is 2, and b is 3; and Z is selected from the group consisting of OH and amino.

5. The colorant composition of claim 3 wherein R' and R'' are each methyl, a is 2, b is 3, and n is at least 1.

6. The colorant composition of claim 3 wherein R' and R'' are each methyl, a is 2, n is 0, and Y has an ethylene oxide content of at least 70 wt. % and a molecular weight of 800 to 1400.

7. The colorant composition of claim 3 wherein R' and R'' are each methyl, a is 3, and n is 0.

8. The colorant composition of claim 2 wherein AB is a reactive dye.

9. The colorant composition of claim 8 wherein AB is selected from the group consisting of C.I. Reactive Black 5, C.I. Reactive Blue 2, C.I. Reactive Blue 4, C.I. Reactive Blue 5, C.I. Reactive Blue 7, C.I. Reactive Blue 15, C.I. Reactive Blue 19, C.I. Reactive Blue 27, C.I. Reactive Violet 3, C.I. Reactive Violet 5, C.I. Reactive Red 2, C.I. Reactive Red 24, C.I. Reactive Orange 4, C.I. Reactive Orange 13, C.I. Reactive Orange 16, C.I. Reactive Orange 78, C.I. Reactive Yellow 3, C.I. Reactive Yellow 13, C.I. Reactive Yellow 14, C. I. Reactive Yellow 17, and C.I. Reactive Yellow 95.

10. The colorant composition of claim 2 wherein

A is selected from the group consisting of azo, phthalocyanine and anthraquinone chromophores;

B is selected from the group consisting of monochlorotriazine, dichlorotriazine, monofluorotriazine, 2,3-dichloroquinoxaline, 2,4-difluor-5-chloropyrimidine, sulfatoethyl sulfone, and vinyl sulfone;

X is NR where R is selected from the group consisting of H, alkyl, aryl, and YZ;

Y is a polysiloxane-poly(oxyalkylene) copolymer having a backbone and a molecular weight of 450 to 5000 which comprises
  (a) a polysiloxane segment characterized by a—Si($R^1$)($R^2$)O—repeating group wherein $R^1$ and $R^2$ are each selected from the group consisting of alkyl, phenyl, vinyl, 3,3,3-trifluoropropyl, and hydrogen; and
  (b) a polyether segment characterized by a poly(oxyalkylene) group which is i) in the copolymer backbone or ii) pendent from a siloxane or silane repeating group, said poly(oxyalkylene) group comprising 50 to 90 wt. % of Y; and Z is a terminal group for Y, selected from the group consisting of OH, alkyl, alkyl ester, amino, and amido.

11. The colorant composition of claim 10 wherein

A is anthraquinone;

B is selected from the group consisting of monochlorotriazine, sulfatoethyl sulfone, and vinyl sulfone;

Y is a polysiloxane-poly(oxyalkylene) copolymer having a backbone and a molecular weight of 800 to 1400 which comprises
  (a) a polysiloxane segment characterized by a—Si($R^1$)($R^2$)O—repeating group wherein $R^1$ and $R^2$ are each alkyl; and
  (b) a polyether segment characterized by a poly(oxyalkylene) group which is i) in the copolymer backbone; and Z is selected from the group consisting of OH and amino.

12. The colorant composition of claim 11 wherein $R^1$ and $R^2$ are each methyl and Y has an ethylene oxide content of at least 70 wt. %.

13. The colorant composition of claim 1 which is liquid in the neat form at 25° C.

14. A method for preparation of a colorant composition of the structure ABXYZ where A is an organic chromophore; B is an electrophilic reactive group covalently bonded to A directly or through a linking group; X is a nucleophilic linking group covalently bonding B and Y; Y is a poly(oxyalkylene)-polysiloxane copolymer; and Z is a terminal group for Y which comprises reacting reactive dye AB with a poly(oxyalkylene)-polysiloxane copolymer under conditions which form a covalent bond.

15. The method of preparation of claim 14 wherein AB is selected from the group consisting of C.I. Reactive Black 5, C.I. Reactive Blue 2, C.I. Reactive Blue 4, C.I. Reactive Blue 5, C.I. Reactive Blue 7, C.I. Reactive Blue 15, C.I. Reactive Blue 19, C.I. Reactive Blue 27, C.I. Reactive Violet 3, C.I. Reactive Violet 5, C.I. Reactive Red 2, C.I. Reactive Red 24, C.I. Reactive Orange 4, C.I. Reactive Orange 13, C.I. Reactive Orange 16, C.I. Reactive Orange 78, C.I. Reactive Yellow 3, C.I. Reactive Yellow 13, C.I. Reactive Yellow 14, C. I. Reactive Yellow 17, and C.I. Reactive Yellow 95; and said poly(oxyalkylene)-containing polysiloxane is a poly(oxyethylene-dimethylsiloxane) copolymer.

* * * * *